United States Patent
Saito et al.

(10) Patent No.: US 12,269,434 B2
(45) Date of Patent: Apr. 8, 2025

(54) WINDSCREEN WIPER BLADE

(71) Applicant: DENSO CORPORATION, Kariya (JP)

(72) Inventors: Makoto Saito, Kariya (JP); Jun Hamamoto, Kariya (JP); Hiroki Nose, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/402,020

(22) Filed: Jan. 2, 2024

(65) Prior Publication Data
US 2024/0140363 A1 May 2, 2024

Related U.S. Application Data

(63) Continuation of application No. PCT/JP2022/017400, filed on Apr. 8, 2022.

(30) Foreign Application Priority Data

Jul. 2, 2021 (JP) .................................. 2021-110781

(51) Int. Cl.
*B60S 1/38* (2006.01)
(52) U.S. Cl.
CPC .......... *B60S 1/3801* (2013.01); *B60S 1/3806* (2013.01); *B60S 1/381* (2013.01); *B60S 1/3848* (2013.01); *B60S 2001/3812* (2013.01); *B60S 2001/3813* (2013.01); *B60S 2001/3815* (2013.01)
(58) Field of Classification Search
CPC ...... B60S 1/381; B60S 1/3848; B60S 1/3801; B60S 1/3806; B60S 2001/3813; B60S 2001/3812; B60S 2001/3815; B60S 2001/3836

USPC ............ 15/250.361, 250.43, 250.44, 250.46, 15/250.201
See application file for complete search history.

(56) References Cited

U.S. PATENT DOCUMENTS

| | | | |
|---|---|---|---|
| 2011/0162161 A1* | 7/2011 | Amado ................. | B60S 1/3801 15/250.361 |
| 2014/0041143 A1* | 2/2014 | Kim ........................ | B60S 1/40 15/250.32 |
| 2022/0032877 A1 | 2/2022 | Matsumoto | |

FOREIGN PATENT DOCUMENTS

JP          2020-045034 A      3/2020

* cited by examiner

*Primary Examiner* — Gary K. Graham
(74) *Attorney, Agent, or Firm* — Oliff PLC (57) ABSTRACT

A windscreen wiper blade includes a blade body, a blade rubber, and a yoke. The blade body includes first and second locks. The yoke is made of a metal plate and includes a first extension and a blade rubber retainer. The first extension has a fitting bead which the first lock engages. The blade rubber retainer extends from the first extension and retains the blade rubber. The yoke also includes second and third extensions. The second extension extends away from the blade rubber from an end of the first extension located away from the fitting bead. The third extension has a locking hole in which the second lock is fit and extends toward the blade rubber from an end of the second extension located away from the first extension. The yoke includes a burned portion defining a boundary between the second and third extension. The second and third extensions overlap.

8 Claims, 12 Drawing Sheets

WINDSCREEN WIPER BLADE

CROSS REFERENCE TO RELATED DOCUMENT

The present application claims the benefit of priority of Japanese Patent Application No. 2021-110781 filed on Jul. 2, 2021, the disclosure of which is incorporated in its entirety herein by reference.

TECHNICAL FIELD

This disclosure relates generally to a windscreen wiper blade.

BACKGROUND OF ART

Patent literature 1 teaches a windscreen wiper blade for use in removing drops of water adhered to a windscreen glass of a vehicle. The windscreen wiper blade includes a blade rubber and a wiper lever assembly which retains the blade rubber. The wiper lever assembly includes a main lever, a pair of movable covers, and a pair of yokes (yoke levers). The main lever is joined to the wiper arm. The movable covers are mounted on ends of the main lever. The yokes are joined to the main lever and the movable cover to be movable. The wiper lever assembly retains the blade rubber using the movable covers and the yokes.

PRIOR ART DOCUMENT

Patent Literature

Patent Literature 1: Japanese patent first publication No. 2020-45034

SUMMARY OF THE INVENTION

The wiper blade disclosed in the above publication is, as described above, equipped with the yoke which includes a metallic part and a resinous yoke body arranged outside the metallic part. The metallic part is embedded in the yoke body using insert-molding techniques. This structure results in a complicated structure of the yoke and an increased cost for the insert molding of the metallic part.

It is an object of this disclosure to provide a wiper blade equipped with a simplified structure of a yoke.

According to one aspect of this disclosure, there is provided a wiper blade which comprises: (a) a blade body which includes a first lock and a second lock and is swingable together with a wiper arm to a first side and a second side in a wiping direction; (b) a blade rubber which wipes a target surface following swinging motion of the blade body to the first side or the second side; and (c) a yoke which is made of a metal plate and disposed between the blade body and the blade rubber. The yoke includes a first extension, a blade rubber retainer, a second extension, and a third extension. The first extension has a first blade body fitting which the first lock engages. The first extension extends in a lengthwise direction of the blade rubber. The blade rubber retainer extends from the first extension and engages the blade rubber. The second extension extends away from the blade rubber from an end of the first extension which is located away from the first blade body fitting. The third extension has a second blade body lock which the second lock engages. The third extension extends from an end of the second extension which is located away from the first extension toward the blade rubber. The yoke also has a turned portion which defines a boundary between the second extension and the third extension. The second extension and the third extension overlap each other.

The above structure results in a simplified structure of the yoke.

BRIEF DESCRIPTION OF THE DRAWINGS

The above object, other objects, features, and advantages of or offered by this disclosure will be understood more fully from the detailed description given hereinbelow and from the accompanying drawings.

In the drawings.

EMBODIMENT FOR CARRYING OUT THE INVENTION

The windscreen wiper blade 10 according to the embodiment of this disclosure will be described below with reference to FIGS. 1 to 10.

The windscreen wiper blade 10 in this embodiment is, as can be seen in FIGS. 1 to 5, used to remove drops of rain, etc., adhered to a wiped surface (which will also be referred to as a target surface) that is an outer surface of windscreen glass of a vehicle. The windscreen wiper blade 10 in this embodiment is implemented by a wiper blade used with a so-called tournament wiper.

The windscreen wiper blade 10 is joined to a head of a wiper arm, not shown, and subjected to mechanical pressure exerted from the wiper arm onto the outer surface of the windscreen glass. The wiper arm constitutes a vehicle's windscreen wiper device together with the windscreen wiper blade 10 and a wiper motor. The windscreen wiper blade 10 is swung back and forth to a first side and a second side in a wiping direction over the outer surface of the windscreen glass following reciprocating swinging motion of the wiper arm. An arrow "UP" in the drawings indicates an upper side of the windscreen wiper blade 10 in a vertical direction thereof. The upper side extends to be substantially orthogonal to the outer surface (i.e., the wiped surface) of the windscreen glass. An arrow "L" in the drawings indicates one side of the windscreen wiper blade 10 in a lengthwise direction thereof. An arrow "FR" in the drawings indicates one (which will also be referred to as a first side) of opposite sides of the windscreen wiper blade 10 in a direction in which the windscreen wiper blade 10 is swung back and forth. Specifically, the side, as indicated by the arrow "FR", is defined as a frontward and obliquely downward side of the vehicle when the vehicle's windscreen wiper device is at rest. In the following discussion, the vertical direction of the windscreen wiper blade 10 will be simply referred to as a vertical direction. The lengthwise direction of the windscreen wiper blade 10 will be merely referred to as a lengthwise direction. The opposite sides to which or opposite directions in which the windscreen wiper blade 10 is swung back and forth will be merely referred to as a front side and a rear side or a frontward direction and a rearward direction.

Figure 4:
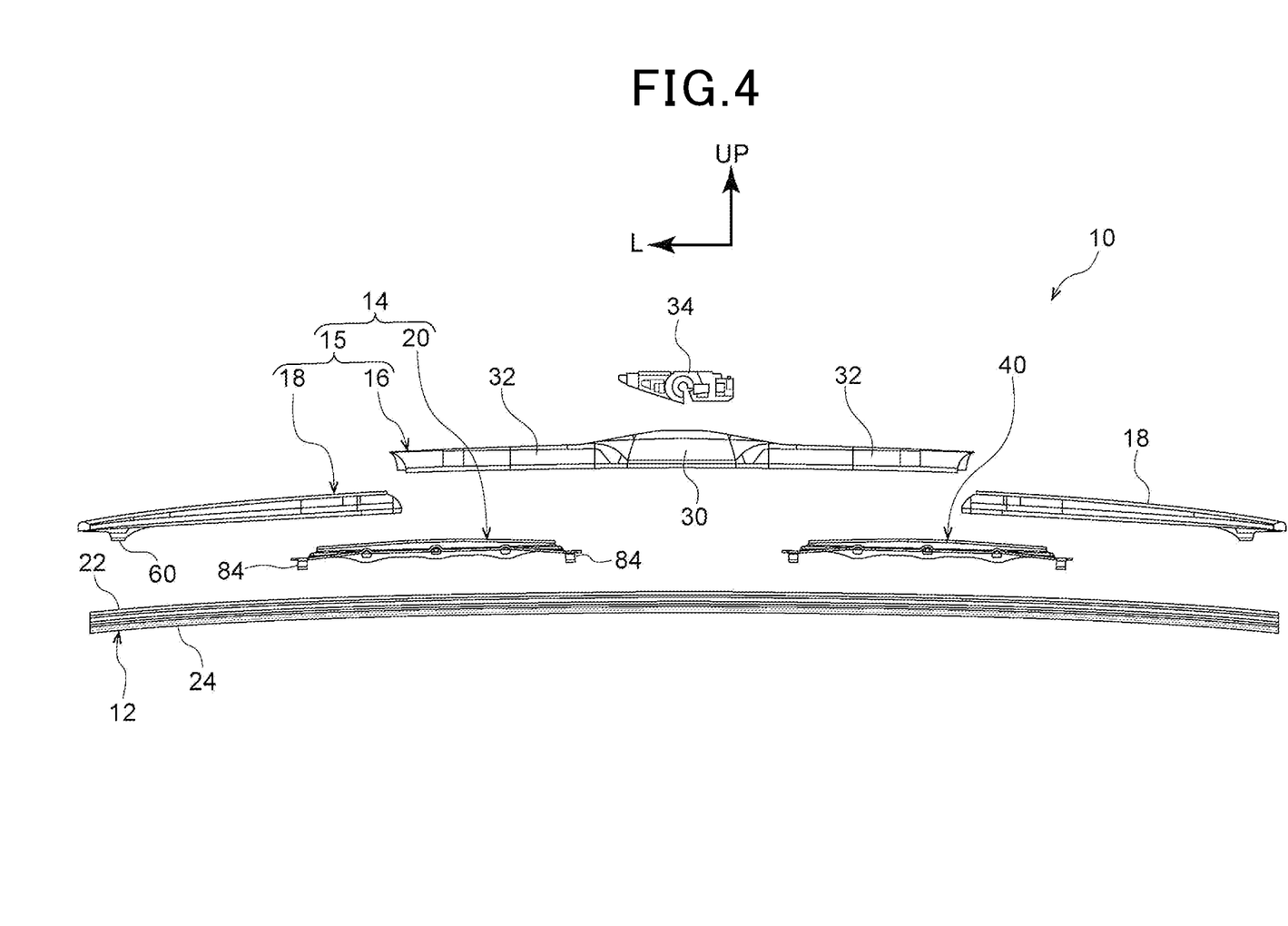
FIG. 4 is an exploded side view of a windscreen wiper blade according to an embodiment.
Figure 5:
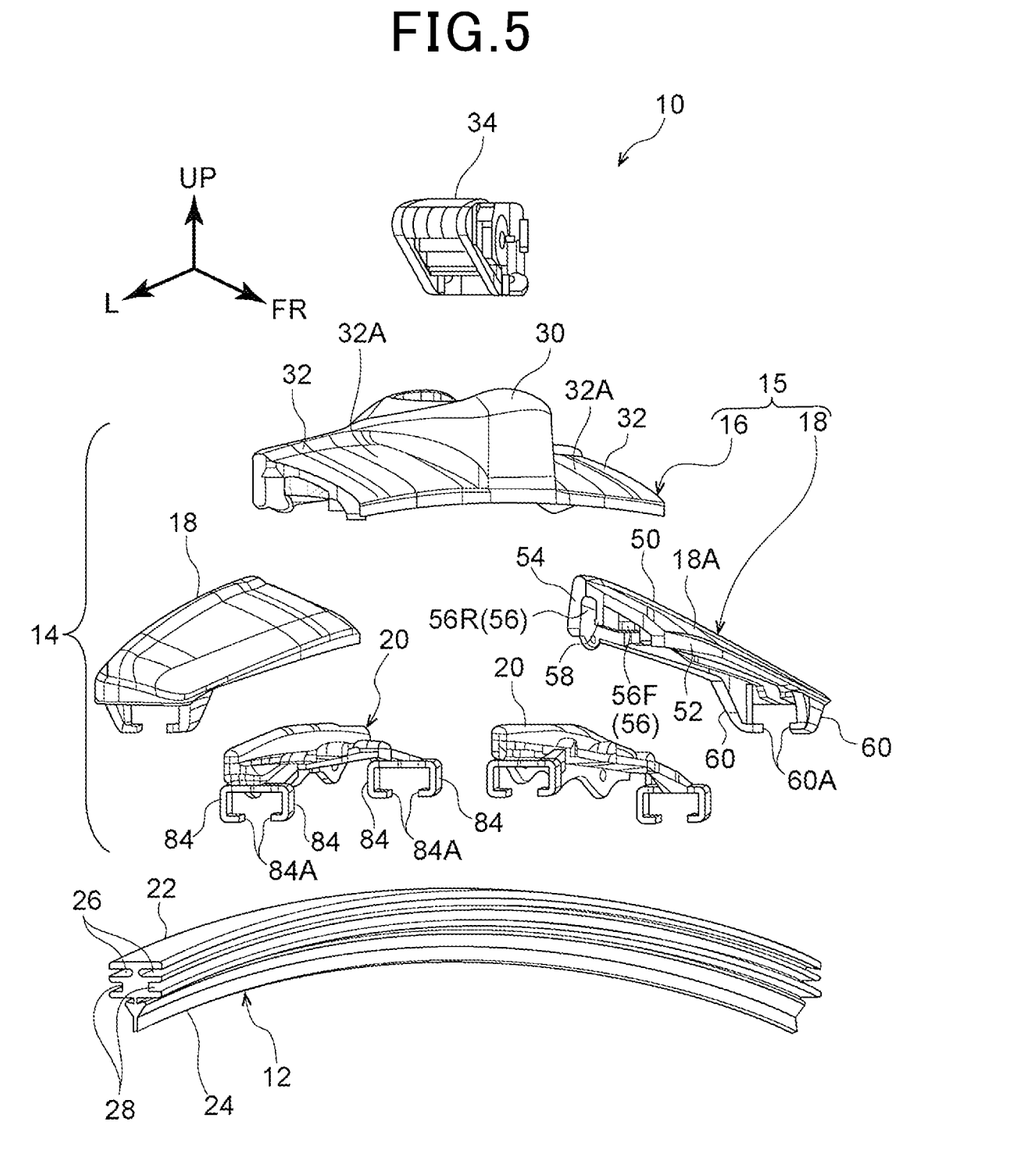
FIG. 5 is an exploded perspective view which illustrates a windscreen wiper blade according to an embodiment.

The windscreen wiper blade 10, as illustrated in FIGS. 4 and 5, includes the blade rubber 12 and the wiper lever assembly 14. The blade rubber 12 works to wipe the outer surface of the windscreen glass. The wiper lever assembly 14 retains the blade rubber 12.

The wiper lever assembly 14 includes the lever 16, a pair of wings 18, and a pair of yokes 20. The lever 16 has a length whose middle portion is secured to head of the wiper arm. The wings 18 are attached to ends of the length of the lever 16. Each of the yokes 20 joints the lever 16 and one of the wings 18 together. The wiper lever assembly 14 supports the blade rubber 12 using the wings 18 and the yokes 20.

Structure of Blade Rubber 12

The blade rubber 12 is made of a strip of rubber having a given length. The blade rubber 12 includes the base 22 (i.e., wiping strip) and the wiping portion 24 (i.e., wiping head). The base 22 is mechanically supported by the wiper lever assembly 14. The wiping portion 24 extends downward from the base 22 and has an edge pressed against the outer surface of the windscreen glass in use. The base 22 of the blade rubber 12 has formed therein a pair of backing grooves 26 which extend in the lengthwise direction of the base 22 and open in opposite front-back directions of the vehicle. The backing grooves 26 are grooves in which metallic strip-made backings, not shown, are fit. The backings are used to disperse physical pressure, as exerted by the wiper arm on the outer surface of the windscreen glass, in the lengthwise direction of the blade rubber 12. The base 22 of the blade rubber 12 also has formed therein a pair of holding grooves 28 which are located beneath the backing grooves 26, extend in the lengthwise direction, and open in the opposite front-back direction of the vehicle.

Structure of Wiper Lever Assembly 14

The wiper lever assembly 14, as described already, includes the lever 16, the pair of wings 18, and the pair of yokes 20. The wiper lever assembly 14 is shaped to have a length symmetrical with respect to a portion thereof joined to the wiper arm.

Structure of Lever 16

The lever 16 is made of a strip of resin material having a given length extending in the lengthwise direction of the windscreen wiper blade 10. The lever 16 defines a middle portion of the length of the wiper lever assembly 14. The lever 16 has a length whose middle portion is configured as the joint 30. The lever 16 also includes a pair of arms 32 extending from the joint 30 in the opposite directions.

The joint 30 is, as can be seen in FIG. 5, shaped to be rectangular, as viewed from above it. The joint 30 has a linking shaft, not shown, disposed therein, to which the head of the wiper arm is joined using the linking clip 34.

The arms 32 extend from ends of the joint 30 in the opposite lengthwise direction. Each of the arms 32, as clearly illustrated in FIGS. 5 and 6, has a cross section which is open downward, as viewed in the lengthwise direction of the lever 16.

Figure 6:
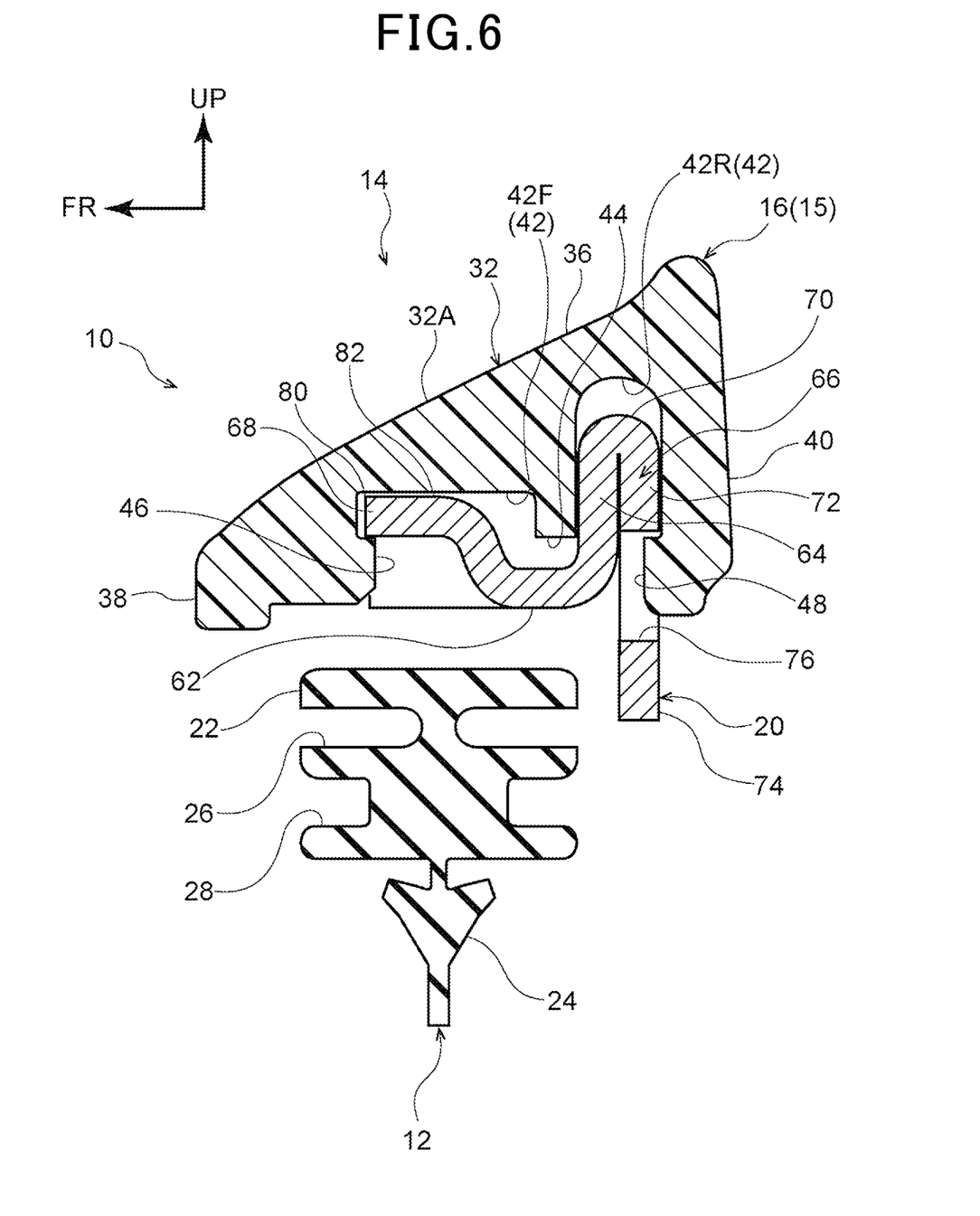
FIG. 6 is a cross sectional view of a windscreen wiper blade taken along the line 6-6 in FIG. 1.

Each of the arms 32, as illustrated in FIG. 6, includes the upper wall 36, the front wall 38, and the rear wall 40. The front wall 38 extends downward from a front end of the upper wall 36. The rear wall 40 extends downward from a rear end of the upper wall 36. Each of the arms 32 also has the yoke fit groove 42 which is formed between the front wall 38 and the rear wall 40, extends in the lengthwise direction, and is open on a lower side thereof. The yoke fit groove 42 includes the front portion 42F and the rear portion 42R. Each of the arms 32 has the intermediate wall 44 arranged between the front portion 42F and the rear portion 42R. The intermediate wall 44 protrudes downward. The yoke fit groove 42 is shaped to have a depth, as measured from an open end of the rear portion 42R, which is greater than that of the front portion 42F, as measured from the open end.

Each of the arms 32 also includes first locking portions 46 and second locking portions 48. The first locking portions 46 are of a cylindrical shape and protrude rearward from the front wall 38 into the yoke fit groove 42. The second locking portions 48 are of a cylindrical shape and protrude frontward from the rear wall 40 into the yoke fit groove 42. The first locking portions 46 are located to face the second locking portions 48 in the front-back direction of the vehicle, i.e., the width direction of the lever 16. Specifically, a first one of the arms 32 has two first locking portions 46 and two second locking portions 48. The first locking portions 46 are located away from each other in the lengthwise direction. The second locking portions 48 are also located away from each other in the lengthwise direction. Similarly, a second one of the arms 32 has two first locking portions 46 and two second locking portions 48. The first locking portions 46 of the second arm 32 are located away from each other in the lengthwise direction. The second locking portions 48 of the second arm 32 are also located away from each other in the lengthwise direction.

Each of the arms 32 has the slant surface 32A on the upper side thereof which extends obliquely upward in the rearward direction.

Structure of Wings 18

Each of the wings 18 is, as illustrated in FIGS. 4 and 5, made of a strip of resin material having a given length. The wings 18 extend from ends of the lever 16 in opposite lengthwise directions of the lever 16. Each of the wings 18 has a cross section which is open downward.

Each of the wings 18, as illustrated in FIG. 5, includes the upper wall 50, the front wall 52, and the rear wall 54. The front wall 52 extends downward from a front end of the upper wall 50. The rear wall 54 extends downward from a rear end of the upper wall 50. Each of the wings 18 also has formed therein the yoke fit groove 56 which is located between the front wall 52 and the rear wall 54, opens at the lower side thereof, and extends in the lengthwise direction thereof. The yoke fit groove 56 has the front portion 56F and the rear portion 56R. Each of the wings 18 also has the intermediate wall 58 arranged between the front portion 56F and the rear portion 56R. The intermediate wall 58 protrudes downward from the wing 18. The yoke fit groove 56 is shaped to have a depth, as measured from an open end of the rear portion 56R, which is greater than that of the front portion 56F, as measured from the open end. In other words, each of the wings 18 has a portion close to the lever 16 which is identical in structure with the arms 32 of the lever 16. Each of the wings 18 has a length whose middle portion has a single first locking portion and a single second locking portion which correspond to the first locking portions 46 and the second locking portions 48 of one of the arms 32 of the lever 16 (see FIG. 6).

Each of the wings 18, like the arms 32, has the slant surface 18A on the upper side thereof which extends upward in the rearward direction. The wings 18 and the lever 16 constitute the blade body 15 defining a design surface of the windscreen wiper blade 10.

Each of the wings 18 has an end portion which is farther away from the lever 16 and has the blade rubber holding portion 60 which is fit on or holds a corresponding one of ends of the length of the blade rubber 12. The blade rubber holding portion 60 includes a pair of front and rear holding fingers 60A which extend downward from the front wall 52 and the rear wall 54, respectively. The front and rear holding fingers 60A have heads (i.e., lower portions) which are bent from major portions thereof to face each other, so that they are enabled to be fit in the above-described holding grooves 28. This achieves joints of the ends of the blade rubber 12 to the blade rubber holding portions 60.

Yokes 20

Figure 7:
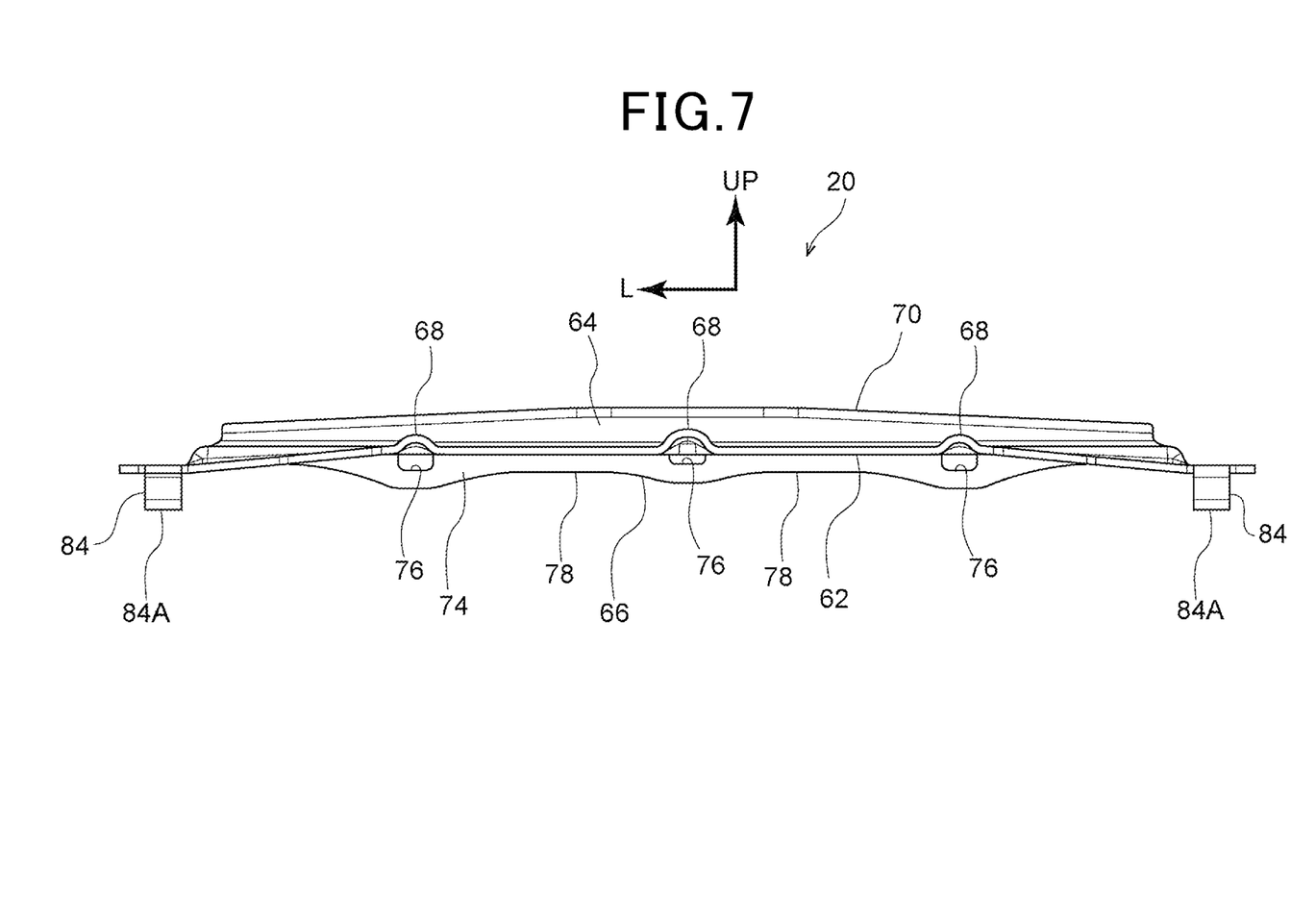
FIG. 7 is a side view which illustrates a yoke.
Figure 8:
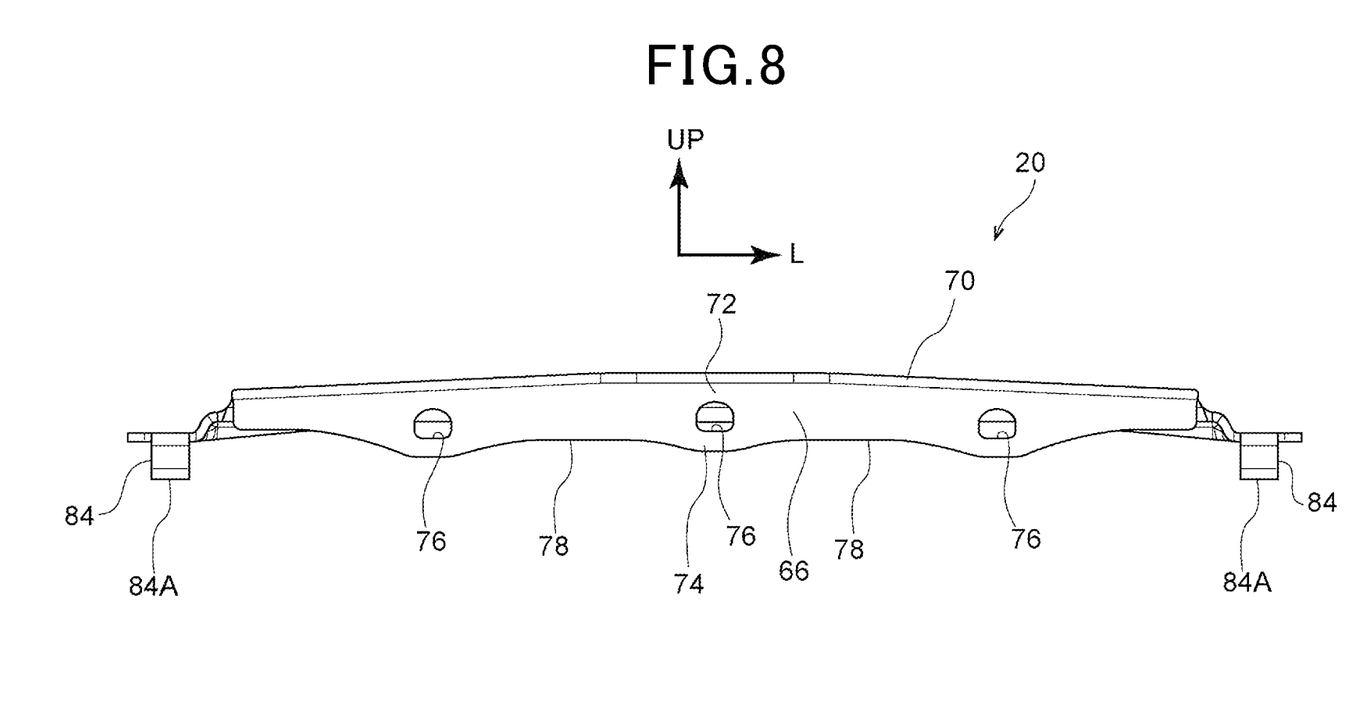
FIG. 8 is a side view which illustrates a yoke, as viewed in a direction opposite that in FIG. 6.

Each of the yokes 20 is, as can be seen in FIGS. 7 and 8, shaped to have a given length extending in the lengthwise direction of the windscreen wiper blade 10. Each of the yokes 20 is made by bending a metallic plate cut into a predetermined shape. The yokes 20 are identical in structure with each other.

Each of the yokes 20 is, as can be seen in FIGS. 4 to 6, arranged among the lever 16 and one of the wings 18 of the blade body 15 and the blade rubber 12. Each of the yokes 20, as illustrated in FIGS. 6 and 7, includes the first extension 62, the second extension 64, and the third extension 66. The first extension 62 lies along the upper surface of the base 22 of the blade rubber 12. The second extension 64 protrudes upward from a rear end of the first extension 62 away from the blade rubber 12. The third extension 66 is turned from an upper end of the second extension 64 and extend downward to the blade rubber 12.

Figure 9:
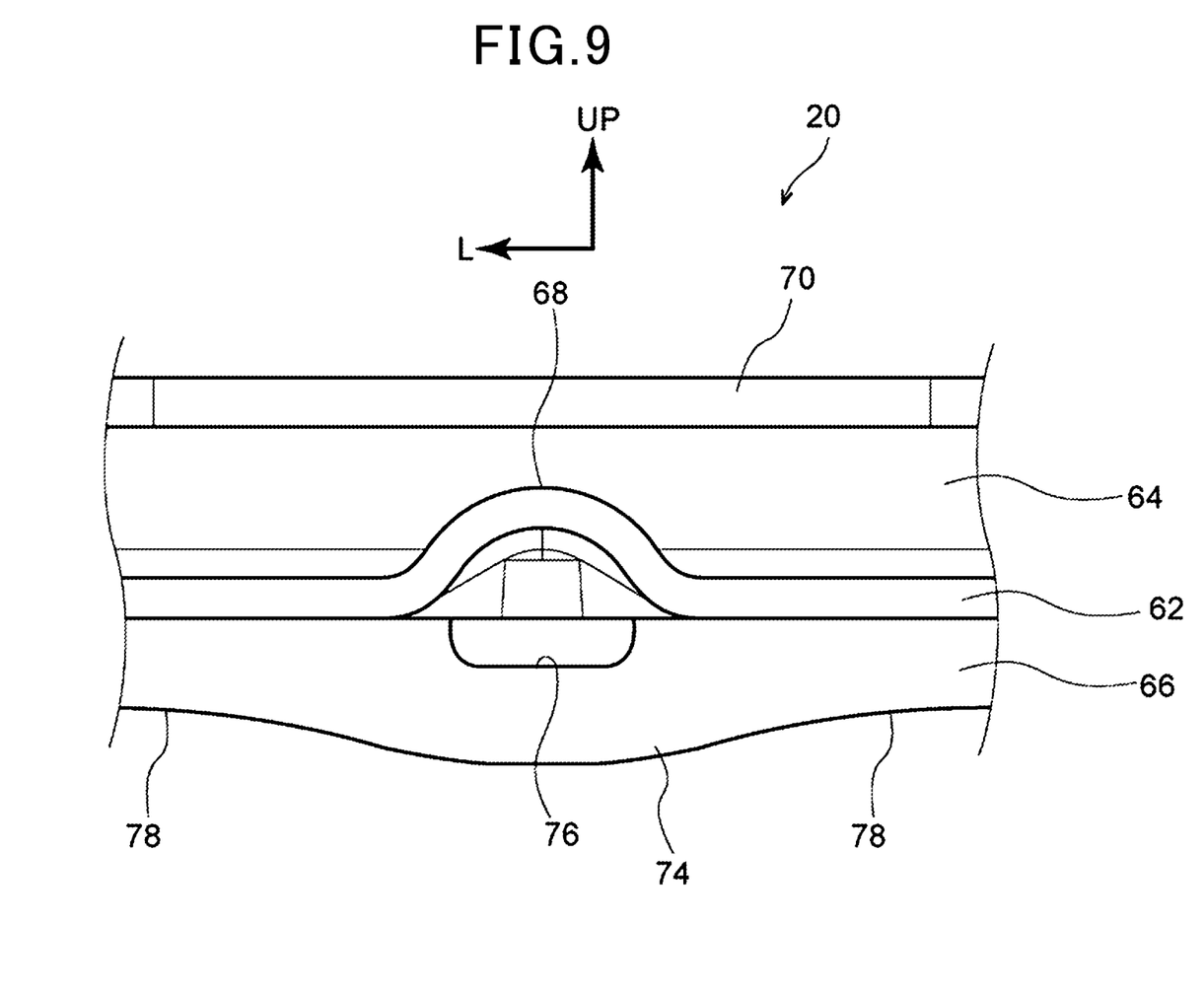
FIG. 9 is an enlarged side view of a fitting bead of a yoke.

The first extension 62 is of a rectangular shape and has a thickness in the vertical direction. The first extension 62 extends both in the front-back direction and in the lengthwise direction. The first extension 62, as illustrated in FIGS. 6, 7, and 9, has the fitting beads 68 formed on a front end thereof. The fitting beads 68 protrude in the thickness wise direction of the first extension 62 away (i.e., upward) from the blade rubber 12. The fitting beads 68 are used as a first blade body fitting. Specifically, in this embodiment, the first extension 63 has three fitting beads 68 formed on the front end thereof. The fitting beads 68 are arranged at a predetermined interval away from each other in the lengthwise direction of the first extension 63. Each of the fitting beads 68 has a lower surface which is curved into a U-shape and is open downward, as viewed from the front side of the first extension 63.

The second extension 64 is, as can be seen in FIGS. 6 and 7, shaped to be rectangular and has a thickness in the front-back direction. The second extension 64 extends both in the vertical direction and the lengthwise direction. The second extension 64, as illustrated in FIG. 7, has a dimension, as measured in the vertical direction, which decreases gradually from a middle portion of the length thereof toward ends of the length thereof.

The third extension 66 is, as can be seen in FIGS. 6 and 8, shaped to be rectangular and has a thickness in the front-back direction. The third extension 66 extends both in the vertical direction and in the lengthwise direction. Each of the yokes 20, as clearly illustrated in FIG. 6, has the bend or turned portion 70 defining the boundary between the second extension 64 and the third extension 66. The turned portion 70 is of a U-shape and made by bending downward from one of the second extension 64 and the third extension 66 to the other, so that upper portions of the second extension 64 and the third extension 66 overlap each other in the thickness direction thereof. The upper portion of the third extension 66 will also be referred to as the overlap 72 coinciding with the upper portion of the second extension 64. The third extension 66 has a lower portion extending downward outside the lower surface of the first extension 62. The lower portion of the third extension 66 will also be referred to as the extension end 74. The extension end 74 has a lower end arranged to face the upper end of the base 22 of the blade rubber 12 in the front-back direction. This causes air, having passed through a gap among the lever 16 and the wings 18 of the blade body 15 and the blade rubber 12, to hit the extension ends 74 of the third extensions 66.

The third extension 66 has the lock holes 76 formed in middle portions of a vertical width thereof. The lock holes 76 pass through the third extension 66 in the thickness direction of the third extension 66 and function as a second blade body lock. Specifically, the third extension 66 has formed therein three locking holes 76 which are arranged away from each other in the lengthwise direction thereof. The locking holes 76 substantially coincide with the fitting beads 68 in the lengthwise direction and the vertical direction. Each of the locking holes 76, as can be seen in FIG. 8, of a rectangular shape, as viewed from the rear of the third extension 66. Each of the locking holes 76 has an upper edge curved into a U-shaped with a lower opening. Each of the locking holes 76, as can be seen in FIG. 6, occupies an area of the third extension 66 between a lower end of the overlap 72 and an upper end of the extension end 74, so that the lower end of each of the locking holes 76 is located closer to the blade rubber 12 than the first extension 62 is. The third extension 66, as clearly illustrated in FIG. 8, has two recesses 78 formed in the lower end of the extension end 74. Each of the recesses 78 is located between a respective adjacent two of the locking holes 76 in the lengthwise direction.

Figure 1:
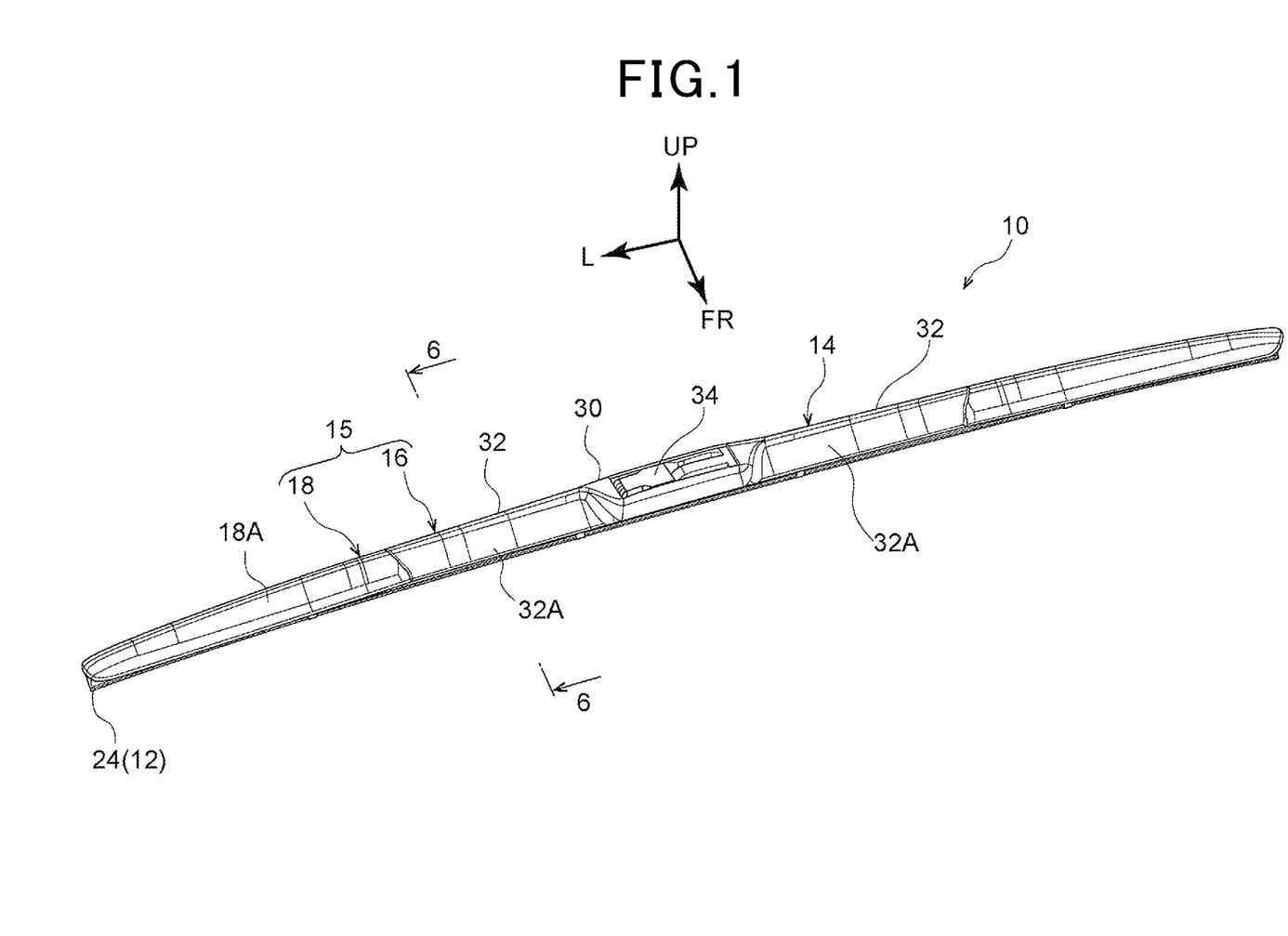
FIG. 1 is a perspective view which illustrates a windscreen wiper blade according to an embodiment.
Figure 2:
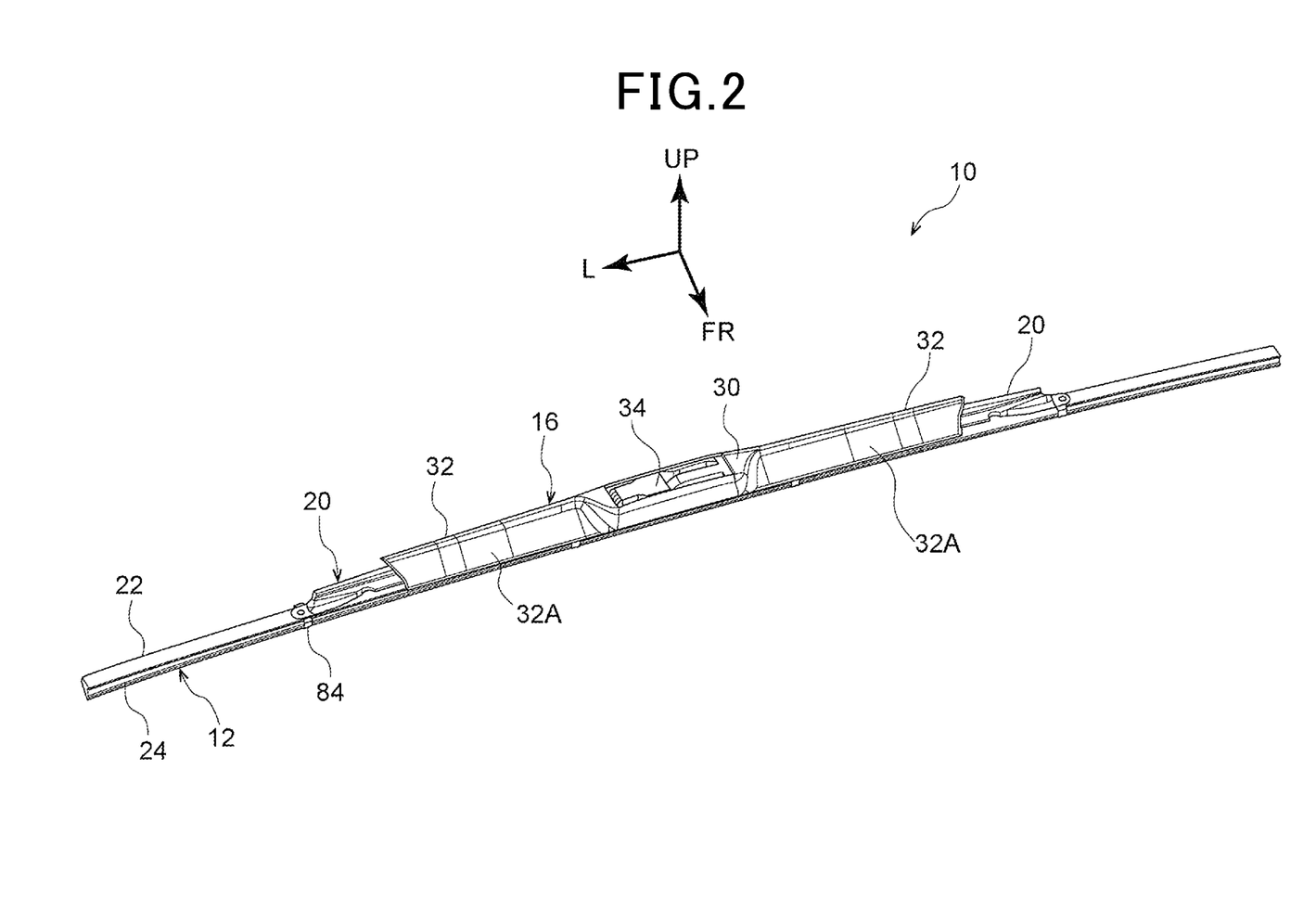
FIG. 2 is a perspective view which illustrates a windscreen wiper blade from which right and left wings are omitted according to an embodiment.
Figure 3:
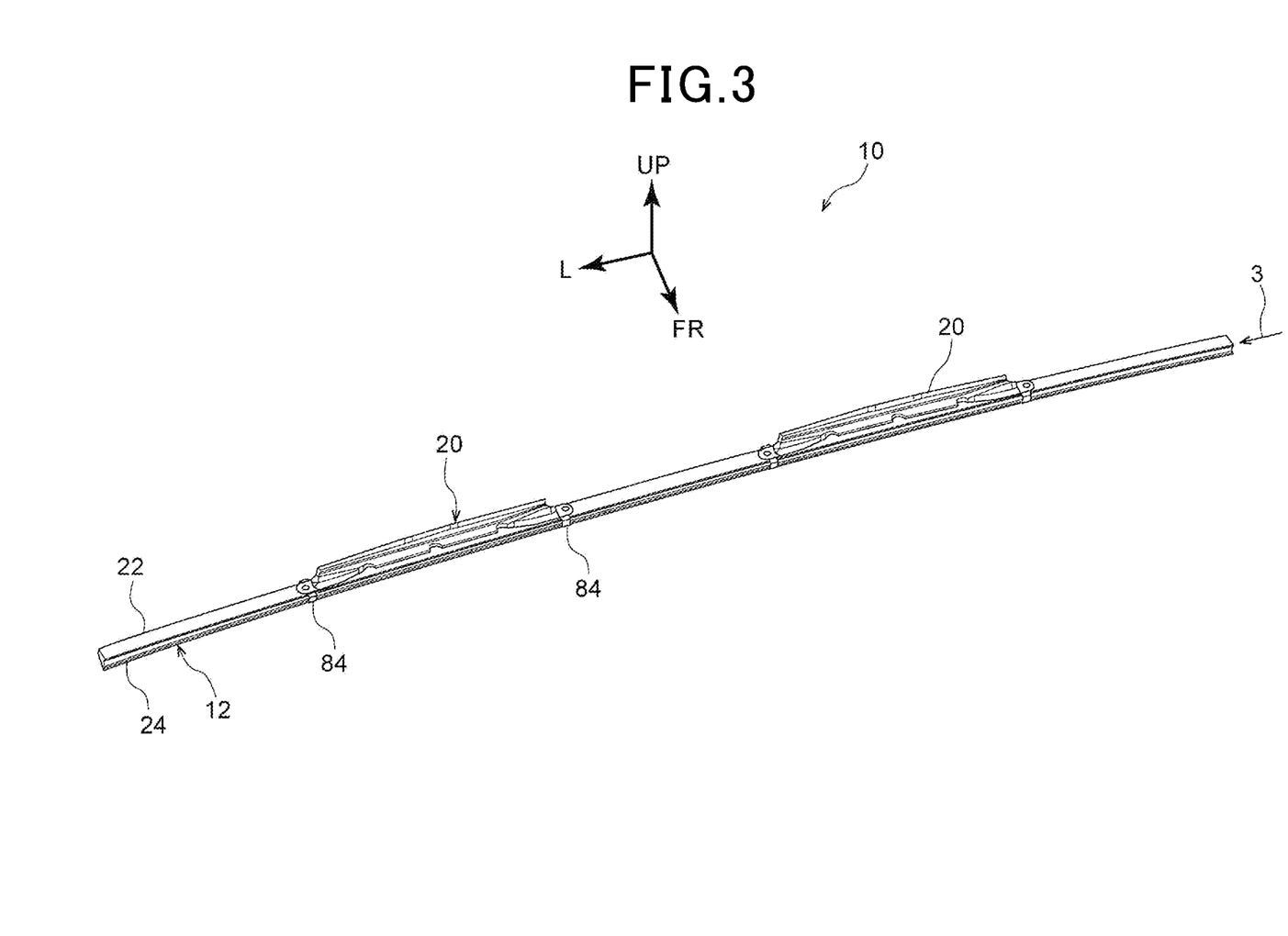
FIG. 3 is a perspective view which illustrates a windscreen wiper blade from which a lever and right and left wings are omitted according to an embodiment.

The two first locking portions 46 formed on a first one of the arms 32 (which will also be referred to below as the first arm 32) of the lever 16 are, as illustrated in FIGS. 2, 5, and 6, fit on the two fitting beads 68 formed on the middle portion of the length of a first one (which will also be referred to as the first yoke 20) of the yokes 20 and a second end portion of the first yoke 20 which is close to the first arm 32. The two second locking portions 48 of the first arm 32 of the lever 16 are fit in the two locking holes 76 formed in the middle portion of the length of the first yoke 20 and the second end portion of the first yoke 20. Although not illustrated, first locks (i.e., the first locking portions) formed on a first one (which will also be referred to below as the first wing 18) of the wings 18 close to the first end side of the lever 16 engage the fitting beads 68 formed on the first end portion of the first yoke 20. Similarly, second locks (i.e., the second locking portions) formed on the first wing 18 close to the first end side of the lever 16 engage the locking holes 76 formed in the first end portion of the first yoke 20. This achieves a joint of the first wing 18 and the lever 16 to the first yoke 20. Specifically, the lever 16 and the first wing 18 are secured to the first yoke 20 in alignment with each other in the lengthwise direction of the windscreen wiper blade 10.

Like the above structure, the two first locking portions 46 formed on a second one of the arms 32 (which will also be referred to below as the second arm 32) of the lever 16 are fit on the two fitting beads 68 formed on the middle portion of the length of a second one (which will also be referred to as the second yoke 20) of the yokes 20 and a first end portion of the second yoke 20 which is close to the second arm 32. The two second locking portions 48 of the second arm 32 of the lever 16 are fit in the two locking holes 76 formed in the middle portion of the length of the second yoke 20 and the first end portion of the second yoke 20. First locks (i.e., the first locking portions 46) formed on a second one (which will also be referred to below as the second wing 18) of the wings 18 close to the second end side of the lever 16 engage the fitting beads 68 formed on the second end portion of the second yoke 20. Similarly, second locks (i.e., the second locking portions 48) formed on the second wing 18 close to the second end side of the lever 16 engage the locking holes 76 formed in the second end portion of the second yoke 20. This achieves a joint of the second wing 18 and the lever 16 to the second yoke 20. In other words, the lever 16 and the second wing 18 are secured to the second yoke 20 in alignment with each other in the lengthwise direction of the windscreen wiper blade 10.

In the yokes 20 to which the lever 16 is secured, the first extension 62 of each of the yokes 20 is, as illustrated in FIG. 6, disposed in the first portion 42F of the yoke fit groove 42 formed in the arm 32 of the lever 16. The second extension 64 and the overlap 72 of the third extension 66 of each of the yokes 20 are disposed in the rear portion 42R of the yoke fit groove 42 of the arm 32 of the lever 16. Although not illustrated, in a condition where the wings 18 are attached to the yokes 20, the first extensions 62 of the yokes 20 are arranged in the front portions 56F of the yoke fit grooves 56 formed in the wings 18. The second extensions 64 and the overlaps 72 of the third extensions 66 of the yokes 20 are arranged in the rear portions 56R of the yoke fit grooves 56 formed in the wings 18.

Clearances exist between each of the yokes 20 and the inner peripheral surface of a corresponding one of the yoke fit grooves 42. This enables each of the yokes 20 to pivot or swing around an axis, as defined to extend in the lengthwise direction thereof, within a given angular range. FIG. 6 demonstrates the yokes 20 when the windscreen wiper blade 10 is at rest. This position of the yokes 20 relative to the lever 16 will be referred to below as a neutral position.

Specifically, when the winding portion 24 of the blade rubber 12 is wiping the outer surface of the windscreen glass following rearward movement of the windscreen wiper blade 10, it will cause each of the yokes 20 to turn to the first side FR from the neutral position around a contact point between the upper front corner 80 of each of the fitting beads 68 of the yoke 20 and the inner peripheral surface of the yoke fit groove 42.

Alternatively, when the winding portion 24 of the blade rubber 12 is wiping the outer surface of the windscreen glass following frontward movement of the windscreen wiper blade 10, it will cause each of the yokes 20 to turn to the second side opposite the first side FR from the neutral position around a contact point between the upper rear end 82 of each of the fitting beads 68 of the yoke 20 and the inner peripheral surface of the yoke fit groove 42.

Clearances between the wing 18 of each of the yokes 20 and the yoke fit groove 56 are identical those between each of the yokes 20 and the inner peripheral surface of the yoke fit groove 42 of the lever 16.

Figure 10:
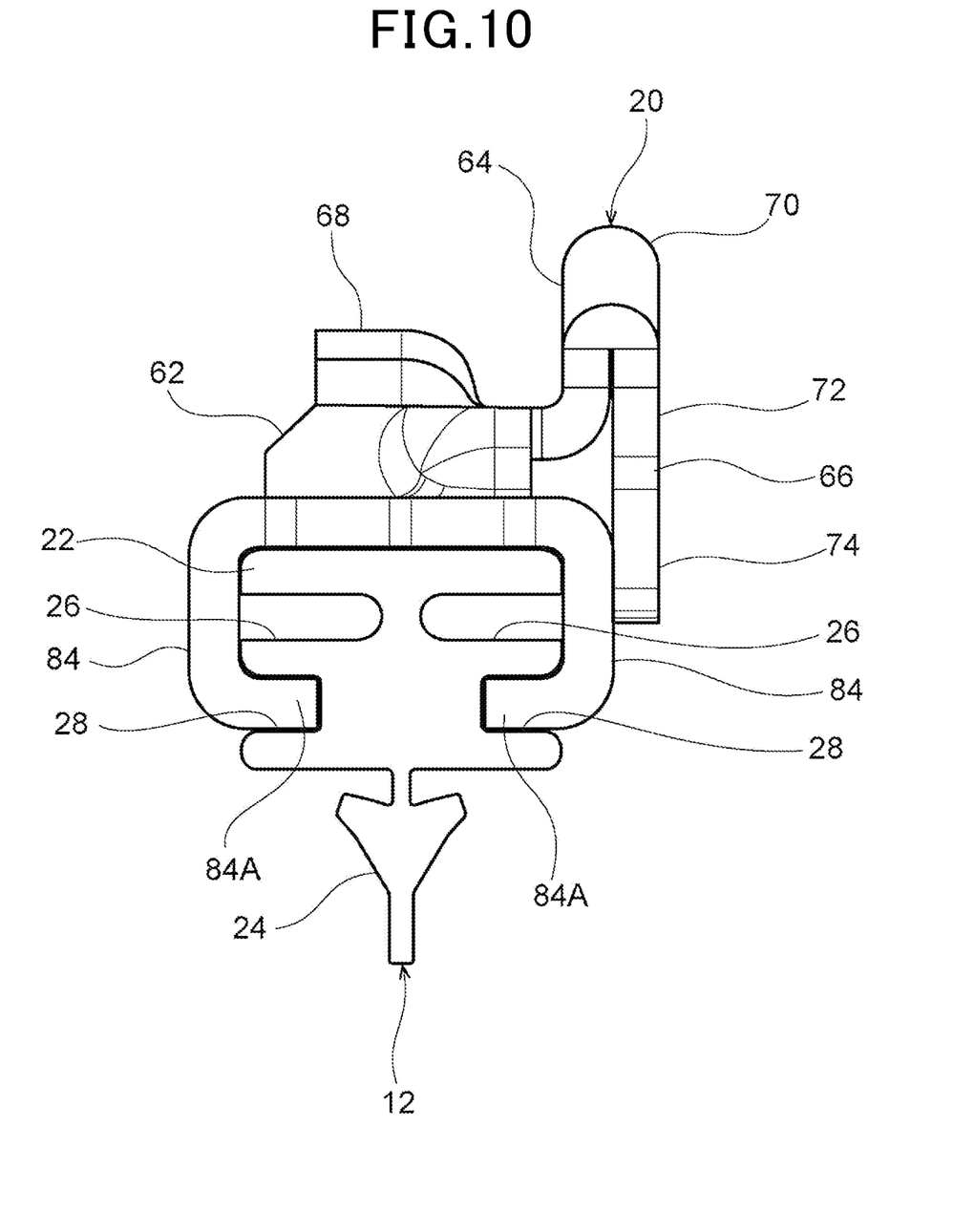
FIG. 10 is a view which illustrates a windscreen wiper blade, as viewed in a direction indicated by an arrow 3 in FIG. 3.

Each of the yokes 20, as illustrated in FIGS. 2, 5, and 10, has the blade rubber retainers 84 which are arranged on end portions thereof and hold a middle portion of the length of the blade rubber 12. Each of the blade rubber retainers 84 includes a pair of front and rear locking fingers (locking elements) 84A protruding downward from a front end portion and a rear end portion of the yoke 20. The front and rear locking fingers 84A have heads (i.e., lower ends) which are bent to directly face each other and are fit in the above-described the holding grooves 28. This supports the middle portion of the length of the blade rubber 12 using the blade rubber retainers 84.

Operation and Beneficial Advantages in this Embodiment

The operation and advantageous effects offered by this embodiment will be described below.

The windscreen wiper blade 10 in this embodiment, as can be seen in FIGS. 5 and 6, has the lever 16 and the wings 18 of the blade body 15 attached thereto. The windscreen wiper blade 10 also has the yokes 20 which retain the blade rubber 12 and each of which is made of a metal plate. Each of the yokes 20, as described above, includes the first extension 62, the second extension 64, and the third extension 66. The boundary between the second extension 64 and the third extension 66 is defined by the turned portion 70 of the yoke 20 to create an overlap of the second extension 64 and the third extension 66. This ensures a required degree of rigidity of the yokes 20 with a simplified structure. Application of configuration or dimensions of the yokes 20 to various types of the lever 16 and the wings 18 is achieved by changing the location of the turned portion 70.

The windscreen wiper blade 10, as can be seen in FIGS. 6, 7, and 9, has the fitting beads 68 which are formed on the first extension 62 of each of the yokes 20 and on which the first locking portions 46 of the lever 16 are fit. This ensures a required degree of rigidity in bending of the first extension 62 in the vertical direction, thereby enhancing the rigidity in bending of the yokes 20 in the vertical direction.

The windscreen wiper blade 10, as illustrated in FIGS. 6 and 8, has the locking holes 76 which are formed in the third extension 66 of each of the yokes 20 and in which the second locking portions 48 of the lever 16. This facilitates the ease with which the locking holes 76 are made in a process of cutting a metal plate to make each of the yokes 20. The locking holes 76 are configured to pass through the thickness of the third extension 66, however, minimize adverse effects on rigidity in bending of the third extension 66 in the vertical direction because the third extension 66 is oriented to have the thickness direction thereof coinciding with the front-back direction of the vehicle. The structure of the windscreen wiper blade 10 in this embodiment, therefore, facilitates the formation of the locking holes 76 without sacrificing the rigidity in bending of the third extensions 66 in the vertical direction.

The third extension 66 of each of the yokes 20, as described above, has the pair of recesses 78 formed in the lower end of the extension end 74. Each of the recesses 78 is located between a respective adjacent two of the locking holes 76 in the lengthwise direction. This removes unwanted parts of the lower end of the extension end 74 of the third extension 66, thereby resulting in a decreased weight of the yokes 20.

The air, as having passed through clearances among the lever 16 and the wings 18 of the blade body 15 and the blade rubber 12 when the vehicle is traveling, hits the extension ends 74 of the third extensions 66 of the yokes 20. In the structure in this embodiment, the velocity of flow of air on the front side of the extension end 74 is lower than that of flow of air on the upper sides of the lever 16 and each of the wings 18, thereby enabling a vertical force (i.e., lifting power) exerted by the flow of air produced by movement of the vehicle on the blade body 15 to be regulated to a desired level. The vertical dimension of the extension end 74 may be determined as a function of the lifting power acting on the blade body 15.

Figure 11:
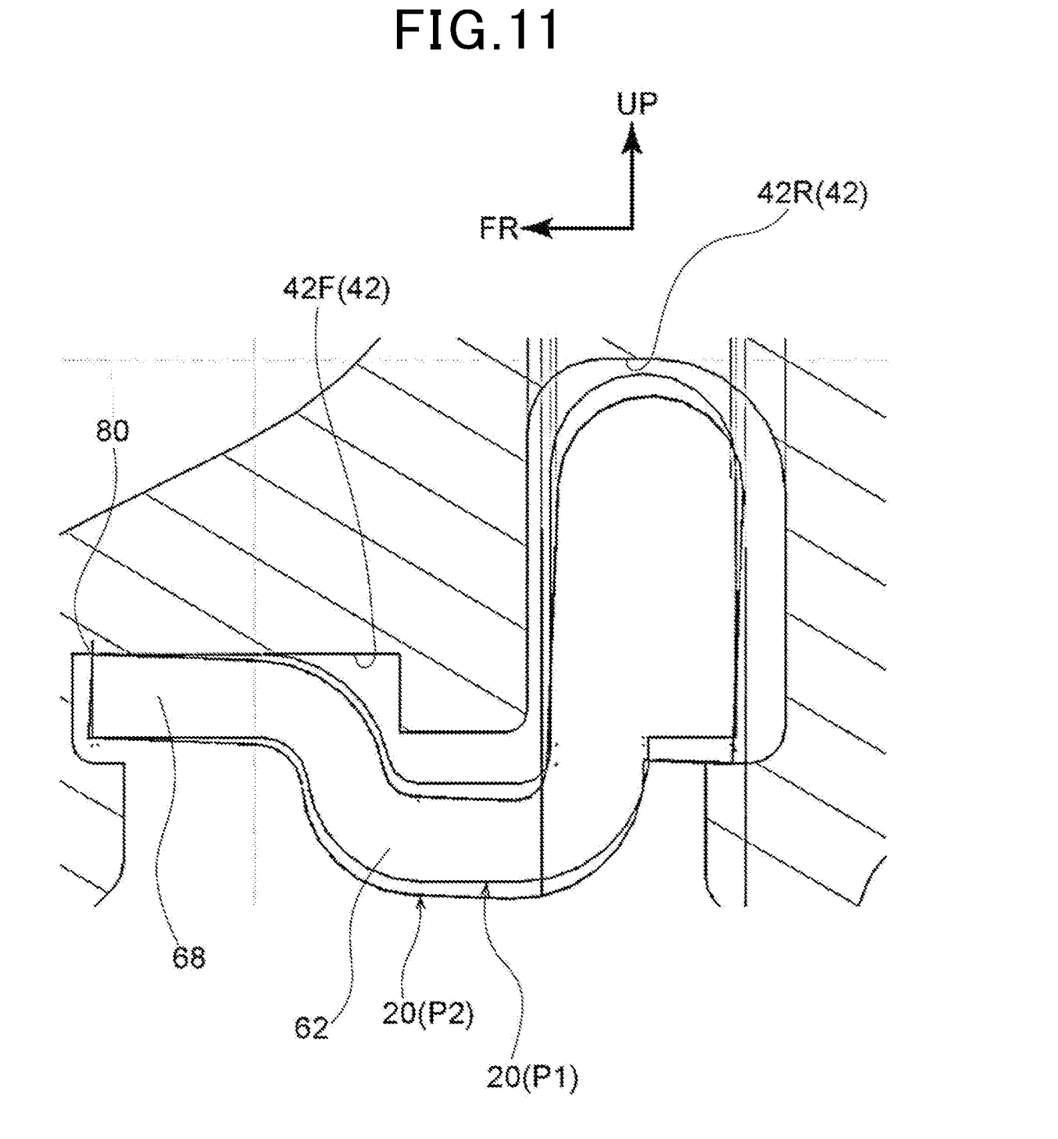
FIG. 11 is a schematic view which demonstrates a yoke leaning from a neutral position to a first side.

When the wiping portion 24 of the blade rubber 12 is wiping the outer surface of the windscreen glass following rearward movement of the windscreen wiper blade 10, each of the yokes 20 is, as illustrated in FIGS. 6 and 11, turned or lean from the neutral position P1 to the first side P2 around a contact point between the upper front corner 80 of each of the fitting beads 68 of each of the yokes 20 and the inner peripheral surface of the yoke fit groove 42.

Figure 12:
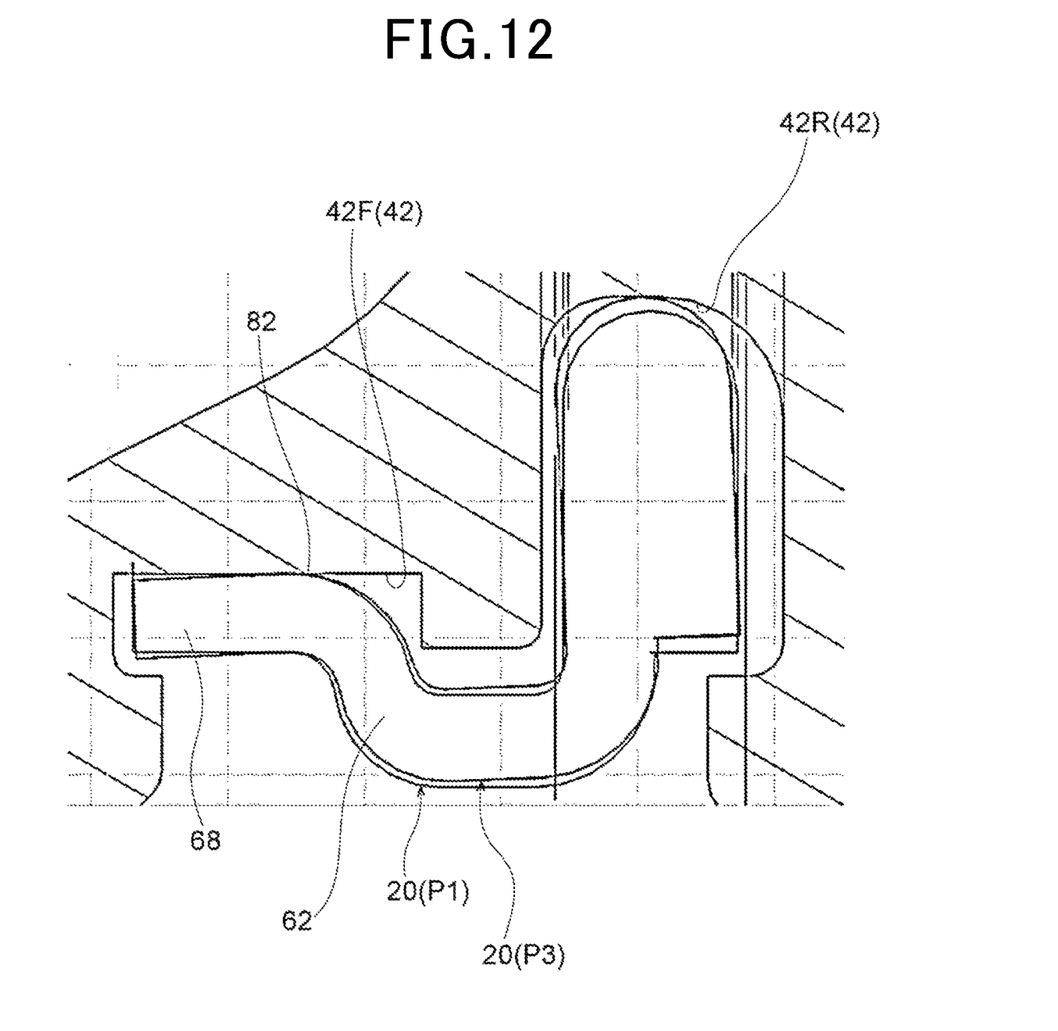
FIG. 12 is a schematic view which demonstrates a yoke leaning from a neutral position to a second side opposite the first side in FIG. 11.

Alternatively, when the wiping portion 24 of the blade rubber 12 is wiping the outer surface of the windscreen glass following frontward movement of the windscreen wiper blade 10, each of the yokes 20 is, as illustrated in FIGS. 6 and 12, inclined or turned from the neutral position P1 to the second side P3 around a contact point between the upper rear end 82 of each of the fitting beads 68 of each of the yokes 20 and the inner peripheral surface of the yoke fit groove 42. As apparent from the above discussion, the contact point between each of the fitting beads 60 and a corresponding one of the yokes 20 is changed between the movements of each of the yokes 20 to the first side P2 and to the second side P3 in the widthwise direction of the windscreen wiper blade 10.

In this embodiment, an angle through which each of the yokes 20 leans from the neutral position to the first side is, as can be seen in FIGS. 11 and 12, greater than that through which each of the yokes 20 leans from the neutral position to the second side. The selection of such angles enables angles at which the wiping portion 24 of the blade rubber 12 contacts the outer surface of the windscreen glass when the windscreen wiper blade 10 is moving rearward and frontward to be adjusted to required angles with high accuracy.

The above discussion has referred to the example where the angle through which each of the yokes 20 leans from the neutral position to the first side is greater than that through which each of the yokes 20 leans from the neutral position to the second side, but however, the windscreen wiper blade 10 may alternatively be designed to determine the angle through which each of the yokes 20 leans or is turned from the neutral position to the first side or the second side depending upon the structure of a windscreen glass of a vehicle.

The above discussion has also referred to the example where the extension end 74 of the third extension 66 each of the yokes 20 has the recesses 78 arranged between an adjacent two of the locking holes 76 in the lengthwise direction of the yoke 20, however, the windscreen wiper blade 10 may alternatively be designed not to have the recesses 78 depending upon a required weight of the yokes 20.

The above discussion has also referred to the example where each of the yokes 20 is designed to have the fitting beads 68 which are formed on the first extension 62 thereof and engage the locking portions 46 of the lever 16, and each of the yokes 20 is also designed to have the locking holes 76 which area formed in the third extension 66 thereof and in which the second locking portions 48 of the lever 16 are fit, however, the windscreen wiper blade 10 may alternatively be designed to form the locking holes 76 in the first extension 62 and also to form the fitting beads 68 on the third extension 66. The windscreen wiper blade 10 may also be designed to have the fitting beads 68 formed both on the first extension 62 and on the third extension 66 and/or to form the locking holes 76 both in the first extension 62 and in the third extension 66.

The embodiments of this disclosure have been described above, but however, this disclosure is not limited to the above statements. The disclosure should be understood to include all possible embodiments and modifications to the shown embodiments which can be embodied without departing from the principle of the disclosure.

This disclosure is not limited to the above embodiments, but may be realized by various embodiments without departing from the purpose of the disclosure. For instance, technical features described in the embodiments which correspond to those referred to in the summary of the invention may be replaced with each other or combined in different ways in order to solve at least a portion of the problems or ensure at least a portion of the beneficial effects. The technical features may be omitted unless otherwise stated as being essential in in principle.

What is claimed is:

1. A wiper blade comprising:
   a blade body which includes a first lock and a second lock and is swingable together with a wiper arm to a first side and a second side in a wiping direction;
   a blade rubber which wipes a target surface following swinging motion of the blade body to the first side or the second side; and
   a yoke which is made of a metal plate and disposed between the blade body and the blade rubber, the yoke including a first metal plate extension, a blade rubber retainer, a second metal plate extension, and a third metal plate extension, the first metal plate extension having a first blade body fitting which the first lock engages, the first metal plate extension extending in a lengthwise direction of the blade rubber, the blade rubber retainer extending from the first metal plate extension and engaging the blade rubber, the second metal plate extension extending away from the blade rubber from an end of the first metal plate extension which is located away from the first blade body fitting, the third metal plate extension having a second blade body lock which the second lock engages, the third metal plate extension extending from an end of the second metal plate extension which is located away from the first metal plate extension toward the blade rubber, the yoke also having a turned portion which defines a boundary between the second metal plate extension and the third metal plate extension, the second metal plate extension and the third metal plate extension overlapping each other.

2. The wiper blade as set forth in claim 1, wherein the first blade body fitting is defined by a bead protruding away from the blade rubber in a thickness direction of the first metal plate extension.

3. The wiper blade as set forth in claim 1, wherein the second blade body lock is defined by a locking hole which passes through the third metal plate extension in a thickness direction of the third metal plate extension.

4. The wiper blade as set forth in claim 3, wherein the locking hole includes a plurality of locking holes,
- the third metal plate extension has the plurality of locking holes arranged at an interval away from each other in a lengthwise direction thereof,
- the third metal plate extension has a recess which is formed in an end thereof facing the blade rubber and disposed between an adjacent two of the locking holes.

5. The wiper blade as set forth in claim 1, wherein the yoke has a clearance between itself and the blade body which permits the yoke to lean around a contact point between the yoke and the blade body within a given angular range,
- the contact point is changed in a widthwise direction of the wiper blade between when the blade body is moved to the first side and when the blade body is moved to the second side.

6. The wiper blade as set forth in claim 1, wherein the third metal plate extension is located where air, having passed through a clearance between the blade body and the blade rubber, hits the third metal plate extension.

7. The wiper blade as set forth in claim 1, wherein at least a portion of the second blade body lock is located closer to the blade rubber than the first metal plate extension is.

8. The wiper blade as set forth in claim 1, wherein the blade body includes a lever joined to the wiper arm and a wing arranged adjacent the lever in a lengthwise direction of the lever,
- the lever and the wing are joined together using the yoke.

\* \* \* \* \*